US012669596B2

(12) United States Patent　　　　(10) Patent No.:　US 12,669,596 B2
Zhang et al.　　　　　　　　　　　　(45) Date of Patent:　　Jun. 30, 2026

(54) RADAR TARGET TRACKING BASED ON RETURN SIGNAL STRENGTH

(71) Applicant: QUALCOMM Incorporated, San Diego, CA (US)

(72) Inventors: Dan Zhang, San Diego, CA (US); Kapil Gulati, Belle Mead, NJ (US); Junyi Li, Fairless Hills, PA (US); Ahmed Bedewy, Hillsborough, NJ (US); Stelios Stefanatos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/286,340

(22) PCT Filed: Jun. 7, 2022

(86) PCT No.: PCT/US2022/032567
　　§ 371 (c)(1),
　　(2) Date: Oct. 10, 2023

(87) PCT Pub. No.: WO2023/287522
　　PCT Pub. Date: Jan. 19, 2023

(65) Prior Publication Data
　　US 2024/0192355 A1　　Jun. 13, 2024

(30) Foreign Application Priority Data

Jun. 22, 2021　(GR) .............................. 20210100408

(51) Int. Cl.
　　G01S 13/72　　　(2006.01)
　　G01S 7/288　　　(2006.01)
　　　　　　(Continued)

(52) U.S. Cl.
　　CPC .......... G01S 13/726 (2013.01); G01S 7/2883 (2021.05); G01S 7/2922 (2013.01); G01S 7/2927 (2013.01); G01S 7/412 (2013.01); G01S 13/931 (2013.01)

(58) Field of Classification Search
　　CPC ........ G01S 7/023; G01S 7/354; G01S 7/2883; G01S 7/2922; G01S 7/2927; G01S 7/412; G01S 13/931; G01S 13/726
　　　　　　(Continued)

(56) References Cited

U.S. PATENT DOCUMENTS

| | | | | | |
|---|---|---|---|---|---|
| 4,151,523 A | * | 4/1979 | Platt | .......................... | G01S 7/06 342/159 |
| 4,450,446 A | * | 5/1984 | Clancy | ................ | G01S 13/5244 342/159 |

(Continued)

FOREIGN PATENT DOCUMENTS

| | | |
|---|---|---|
| CN | 101271158 A | 9/2008 |
| CN | 108226919 A | 6/2018 |
| EP | 3620810 A1 | 3/2020 |

OTHER PUBLICATIONS

International Search Report and Written Opinion—PCT/US2022/032567—ISA/EPO—Feb. 24, 2023.

*Primary Examiner* — Michael W Justice
(74) *Attorney, Agent, or Firm* — Procopio, Cory, Hargreaves & Savitch

(57) ABSTRACT

This disclosure provides systems, devices, apparatus, and methods, including computer programs encoded on storage media, for radar target tracking based on return signal strength. A wireless device, such as a radar device, may measure a received signal strength of a detected signal. The received signal strength may be associated with at least one bin of a radar image. The wireless device may compare the received signal strength to a filtered signal strength. The (Continued)

filtered signal strength may be associated with a threshold difference in signal strength from the filtered signal strength. The wireless device may track the at least one bin of the radar image in response to the received signal strength being less than or equal to the threshold difference in signal strength from the filtered signal strength.

30 Claims, 10 Drawing Sheets

(51) Int. Cl.

| | | |
|---|---|---|
| *G01S 7/292* | (2006.01) | |
| *G01S 7/41* | (2006.01) | |
| *G01S 13/931* | (2020.01) | |

(58) Field of Classification Search
USPC ............................................... 342/70, 91, 93
See application file for complete search history.

(56) References Cited

U.S. PATENT DOCUMENTS

| | | | | |
|---|---|---|---|---|
| 4,459,592 | A * | 7/1984 | Long | G01S 13/524 |
| | | | | 342/160 |
| 4,683,474 | A * | 7/1987 | Randig | H01Q 21/00 |
| | | | | 342/368 |
| 4,684,950 | A * | 8/1987 | Long | G01S 13/524 |
| | | | | 342/159 |
| 5,248,976 | A * | 9/1993 | Niho | G01S 13/9019 |
| | | | | 342/25 A |
| 5,491,645 | A * | 2/1996 | Kennedy | G01S 13/72 |
| | | | | 701/482 |
| 5,539,412 | A * | 7/1996 | Mendelson | G01R 23/16 |
| | | | | 324/76.19 |
| 5,734,347 | A * | 3/1998 | McEligot | G01S 13/89 |
| | | | | 342/146 |
| 6,396,867 | B1 * | 5/2002 | Tiedemann, Jr. | C08L 23/12 |
| | | | | 375/141 |
| 6,720,905 | B2 * | 4/2004 | Levitan | F41H 13/00 |
| | | | | 342/52 |
| 6,757,320 | B2 * | 6/2004 | Tiedemann, Jr. | C08L 23/06 |
| | | | | 375/141 |
| 7,526,100 | B1 * | 4/2009 | Hartman | G06V 10/255 |
| | | | | 382/103 |
| 7,567,204 | B2 * | 7/2009 | Sakamoto | G01S 13/345 |
| | | | | 342/91 |
| 7,587,102 | B2 * | 9/2009 | Maris | G01S 13/87 |
| | | | | 382/291 |
| 7,589,666 | B2 * | 9/2009 | Passarelli, Jr. | G01S 13/5244 |
| | | | | 342/194 |
| 7,684,464 | B2 * | 3/2010 | Linsky | H04L 25/0204 |
| | | | | 375/136 |
| 7,764,222 | B2 * | 7/2010 | Tyree | F41G 7/226 |
| | | | | 342/91 |
| 7,768,448 | B2 * | 8/2010 | Tyree | G01S 3/784 |
| | | | | 342/195 |
| 8,229,708 | B2 * | 7/2012 | Mantravadi | H04B 1/1027 |
| | | | | 702/191 |
| 8,982,668 | B2 * | 3/2015 | Horsky | G01S 15/931 |
| | | | | 367/39 |
| 9,155,014 | B2 * | 10/2015 | Tenny | H04W 36/302 |
| 9,338,031 | B2 * | 5/2016 | Zhang | H04L 25/0202 |

| | | | | |
|---|---|---|---|---|
| 9,454,827 | B2 * | 9/2016 | Deng | G06T 7/254 |
| 9,521,565 | B2 * | 12/2016 | Tenny | H04W 24/08 |
| 9,607,015 | B2 * | 3/2017 | Gao | G06F 16/78 |
| 9,646,389 | B2 * | 5/2017 | Gao | G06T 7/248 |
| 10,089,330 | B2 * | 10/2018 | Gao | G06F 16/7837 |
| 10,330,773 | B2 * | 6/2019 | Rao | G01S 7/003 |
| 10,334,465 | B2 * | 6/2019 | Vajapeyam | H04L 5/006 |
| 10,346,465 | B2 * | 7/2019 | Gao | G06F 3/0488 |
| 10,393,871 | B2 * | 8/2019 | Bilik | G01S 13/343 |
| 10,473,429 | B1 * | 11/2019 | Louchard | G06V 10/48 |
| 10,495,750 | B1 * | 12/2019 | Musgrove | G01S 13/904 |
| 10,582,409 | B2 * | 3/2020 | Vajapeyam | H04L 5/006 |
| 11,049,267 | B2 * | 6/2021 | Selviah | G06T 7/33 |
| 11,353,549 | B2 * | 6/2022 | Jansen | G01S 13/931 |
| 11,353,553 | B2 * | 6/2022 | Peng | G01S 7/415 |
| 11,460,541 | B2 * | 10/2022 | Oren | G01S 7/354 |
| 11,476,795 | B2 * | 10/2022 | West | H02S 10/20 |
| 11,579,242 | B2 * | 2/2023 | Rao | G01S 7/354 |
| 11,853,068 | B1 * | 12/2023 | Agarwal | G05D 1/0088 |
| 2004/0041724 | A1 * | 3/2004 | Levitan | F41H 13/00 |
| | | | | 342/52 |
| 2006/0239559 | A1 * | 10/2006 | Maris | G06F 18/256 |
| | | | | 382/183 |
| 2008/0001808 | A1 * | 1/2008 | Passarelli | G01S 13/5244 |
| | | | | 342/26 R |
| 2008/0123540 | A1 * | 5/2008 | Mantravadi | H04B 1/1027 |
| | | | | 370/252 |
| 2008/0231496 | A1 * | 9/2008 | Sakamoto | G01S 7/354 |
| | | | | 342/159 |
| 2010/0066596 | A1 * | 3/2010 | Tyree | F41G 7/226 |
| | | | | 342/195 |
| 2010/0067587 | A1 * | 3/2010 | Tyree | F41G 7/2213 |
| | | | | 375/259 |
| 2010/0124172 | A1 * | 5/2010 | Tenny | H04W 24/08 |
| | | | | 370/242 |
| 2010/0124203 | A1 * | 5/2010 | Tenny | H04W 36/08 |
| | | | | 370/331 |
| 2011/0195684 | A1 * | 8/2011 | Zhang | H04L 25/0202 |
| | | | | 455/226.1 |
| 2012/0120768 | A1 * | 5/2012 | Horsky | G01S 15/931 |
| | | | | 327/60 |
| 2015/0178320 | A1 * | 6/2015 | Gao | G06F 16/7335 |
| | | | | 707/708 |
| 2015/0178930 | A1 * | 6/2015 | Gao | G06F 16/78 |
| | | | | 382/103 |
| 2015/0178931 | A1 * | 6/2015 | Gao | G06T 11/60 |
| | | | | 382/103 |
| 2015/0178953 | A1 * | 6/2015 | Gao | G06F 3/04842 |
| | | | | 345/681 |
| 2016/0063727 | A1 * | 3/2016 | Gao | G06V 10/50 |
| | | | | 382/103 |
| 2016/0227427 | A1 * | 8/2016 | Vajapeyam | H04L 5/0048 |
| 2017/0363711 | A1 * | 12/2017 | Rao | G01S 7/354 |
| 2018/0164423 | A1 * | 6/2018 | Bilik | G01S 13/343 |
| 2018/0267160 | A1 | 9/2018 | Slemp | |
| 2018/0364327 | A1 | 12/2018 | Weldum | |
| 2019/0158011 | A1 * | 5/2019 | West | G06N 20/20 |
| 2019/0257942 | A1 * | 8/2019 | Smith | G01S 7/40 |
| 2019/0289486 | A1 * | 9/2019 | Vajapeyam | H04W 76/28 |
| 2019/0331765 | A1 * | 10/2019 | Rao | G01S 7/003 |
| 2020/0033442 | A1 | 1/2020 | Gulati et al. | |
| 2020/0043186 | A1 * | 2/2020 | Selviah | G06T 7/33 |
| 2020/0072941 | A1 * | 3/2020 | Jansen | G01S 13/345 |
| 2020/0309938 | A1 * | 10/2020 | Oren | G01S 13/003 |
| 2021/0132185 | A1 * | 5/2021 | Lin | G01S 13/343 |
| 2021/0311167 | A1 * | 10/2021 | Peng | G06V 10/806 |

* cited by examiner

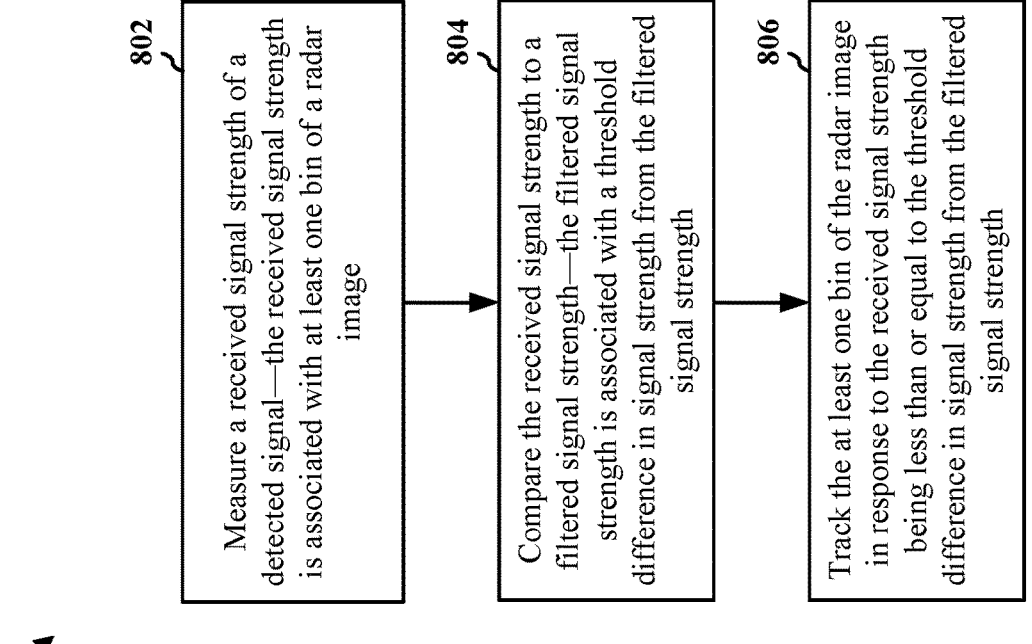

802

Measure a received signal strength of a detected signal—the received signal strength is associated with at least one bin of a radar image

804

Compare the received signal strength to a filtered signal strength—the filtered signal strength is associated with a threshold difference in signal strength from the filtered signal strength

806

Track the at least one bin of the radar image in response to the received signal strength being less than or equal to the threshold difference in signal strength from the filtered signal strength

Figure 9:
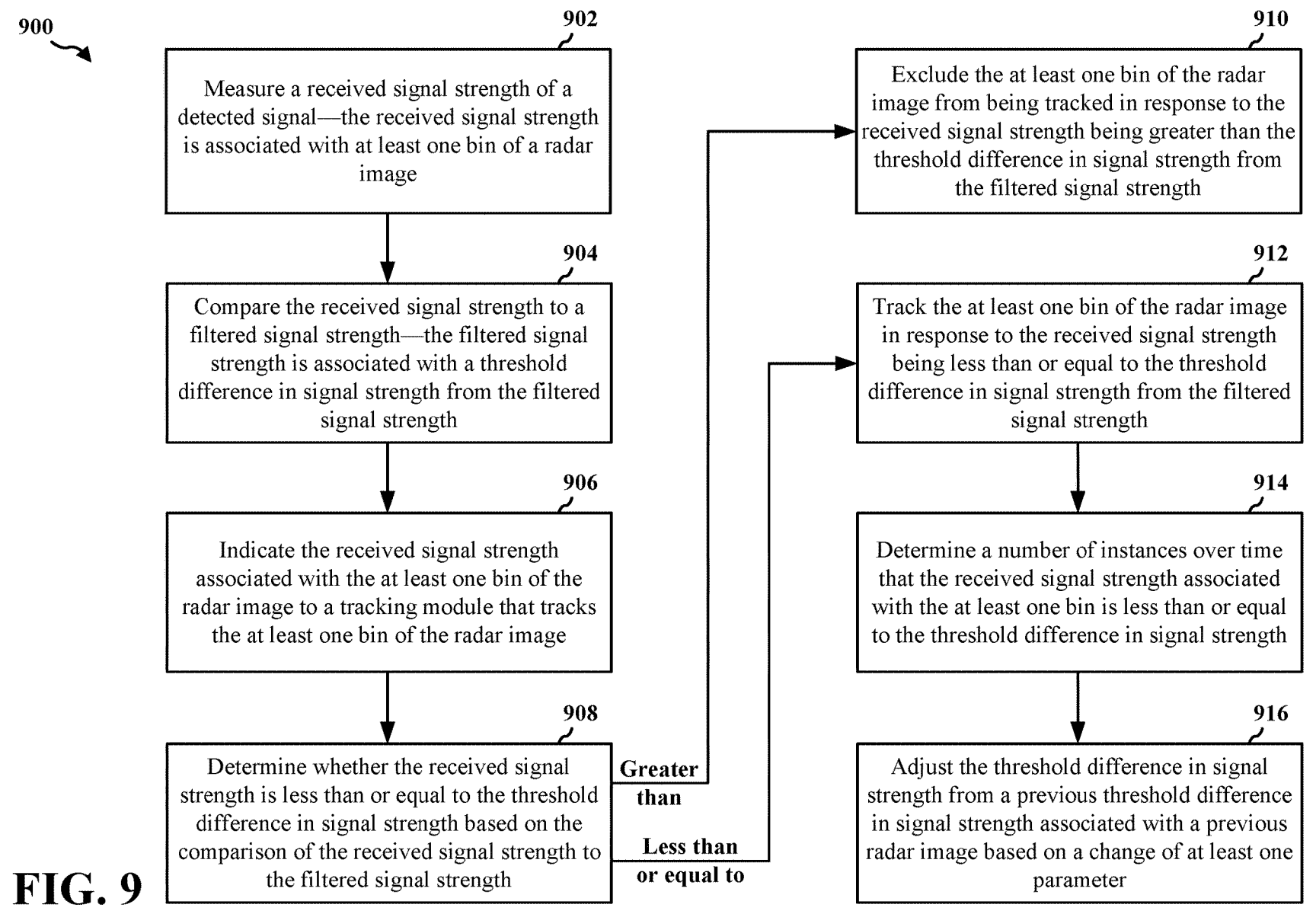

Exclude the at least one bin of the radar image from being tracked in response to the received signal strength being greater than the threshold difference in signal strength from the filtered signal strength

912

Track the at least one bin of the radar image in response to the received signal strength being less than or equal to the threshold difference in signal strength from the filtered signal strength

914

Determine a number of instances over time that the received signal strength associated with the at least one bin is less than or equal to the threshold difference in signal strength

916

Adjust the threshold difference in signal strength from a previous threshold difference in signal strength associated with a previous radar image based on a change of at least one parameter

902

Measure a received signal strength of a detected signal—the received signal strength is associated with at least one bin of a radar image

904

Compare the received signal strength to a filtered signal strength—the filtered signal strength is associated with a threshold difference in signal strength from the filtered signal strength

906

Indicate the received signal strength associated with the at least one bin of the radar image to a tracking module that tracks the at least one bin of the radar image

908

Determine whether the received signal strength is less than or equal to the threshold difference in signal strength based on the comparison of the received signal strength to the filtered signal strength

Greater than

Less than or equal to

RADAR TARGET TRACKING BASED ON RETURN SIGNAL STRENGTH

CROSS-REFERENCE TO RELATED APPLICATION

This application is a National Stage Application filed under 35 U.S.C. § 371 of PCT International Application No. PCT/US2022/032567, entitled "RADAR TARGET TRACKING BASED ON RETURN SIGNAL STRENGTH" and filed Jun. 7, 2022, which claims the benefit of Greek application No. 20210100408, entitled "RADAR TARGET TRACKING BASED ON RETURN SIGNAL STRENGTH" and filed on Jun. 22, 2021, which are expressly incorporated by reference herein in their entirety.

TECHNICAL FIELD

The present disclosure relates generally to communication systems, and more particularly, to a radar target tracking based on return signal strength.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may measure a received signal strength of a detected signal, the received signal strength associated with at least one bin of a radar image; compare the received signal strength to a filtered signal strength, the filtered signal strength associated with a threshold difference in signal strength from the filtered signal strength; and track the at least one bin of the radar image in response to the received signal strength being less than or equal to the threshold difference in signal strength from the filtered signal strength.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication at a wireless device.

FIG. 9 is a flowchart of a method of wireless communication at a wireless device.

DETAILED DESCRIPTION

Figure 1:
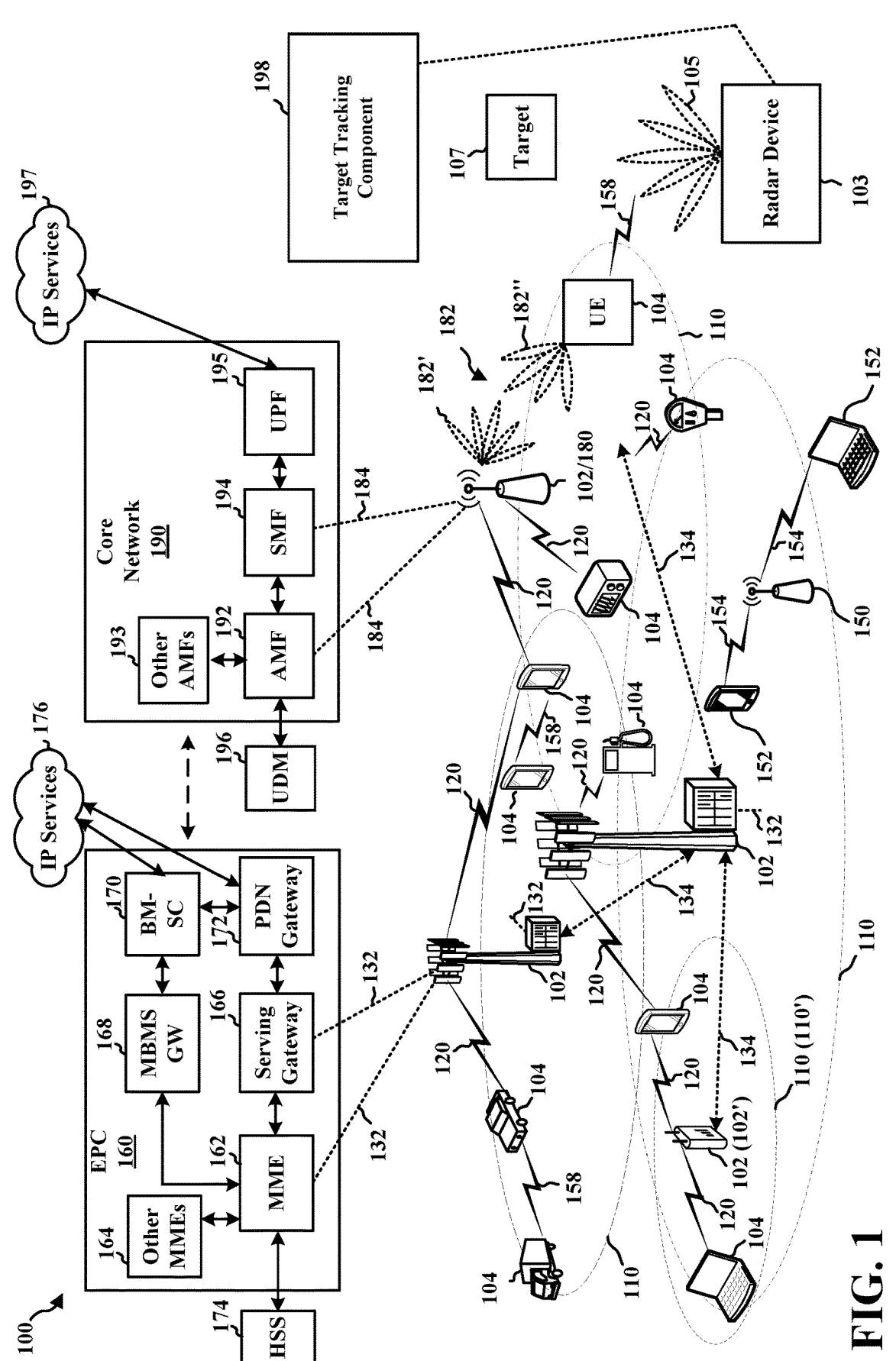
FIG. 1 is a diagram illustrating an example of a radar device and a wireless communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram 100 illustrating an example of a wireless communications system and an access network in which base stations 102 or 180 may wirelessly communicate with user equipments (UEs) 104. Some wireless devices may perform radar signal sensing. For example, a radar device 103 may transmit a wireless signal 105 and use information about the signal to image an environment or determine information about a target 107 based on range, doppler, and/or angle information determined from the wireless signal. The signal may include a defined waveform, such as a frequency modulated continuous wave (FMCW) or a pulse or chirp waveform.

In some examples, the radar device 103 may transmit a radar signal to determine information about a target or an environment. A target tracking component 198 included in the radar device 103 may be configured to measure a received signal strength of a detected signal, the received signal strength associated with at least one bin of a radar image; compare the received signal strength to a filtered signal strength, the filtered signal strength associated with a threshold difference in signal strength from the filtered signal strength; and track the at least one bin of the radar image in response to the received signal strength being less than or equal to the threshold difference in signal strength from the filtered signal strength.

A received signal may be compared to the transmitted signal to determine information about the target 107 or environment. Radar signal sensing may be employed for automotive radar, e.g., detecting an environment around a vehicle, nearby vehicles or items, detecting information for smart cruise control, collision avoidance, etc. Radar signal sensing may be employed for gesture recognition, e.g., a human activity recognition, a hand motion recognition, a facial expression recognition, a keystroke detection, sign language detection, etc. Radar signal sensing may be employed to acquire contextual information, e.g., location detection, tracking, determining directions, range estimation, etc. Radar signal sensing may be employed to image an environment, e.g., to provide a 3-dimensional (3D) map for virtual reality (VR) applications. Radar signal sensing may be employed to provide high resolution localization, e.g., for industrial Internet-of-things (IIoT) applications. In some examples, the radar device 103 may provide consumer level radar with advanced detection capabilities. Radar signal sensing may provide touchless or device free interaction with a device or system. For example, a wireless device may detect user gestures to trigger an operation at the wireless device.

In some examples, radar signal sensing may be based on frequency ranges that overlap with wireless communication systems for the signal 105, such as the wireless communication system illustrated in FIG. 1. The radar device 103 may use a waveform for the signal 105 that relates to a communication system. As one non-limiting example, radar signal sensing may be performed via a mmW signal, such as a Frequency Range2 (FR2), Frequency Range 2x (FR2x), and/or Frequency Range 4 (FR4) signal, which may provide improved range for radar signal detection. In some examples, the radar device 103 may be capable of performing radar signal sensing and wireless communication. In some examples, the radar device 103 may correspond to a UE 104, a base station 102 or 180, or other access point in the communication system of FIG. 1. In other examples, the radar device 103 may perform radar signal sensing without having wireless communication capabilities. As illustrated in FIG. 1, the radar device 103 may use beams to transmit the signal 105. The radar device 103 may be within or outside of a coverage area 110 of a base station 102 or 180. The wireless communications system illustrated in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102′ or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182′. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
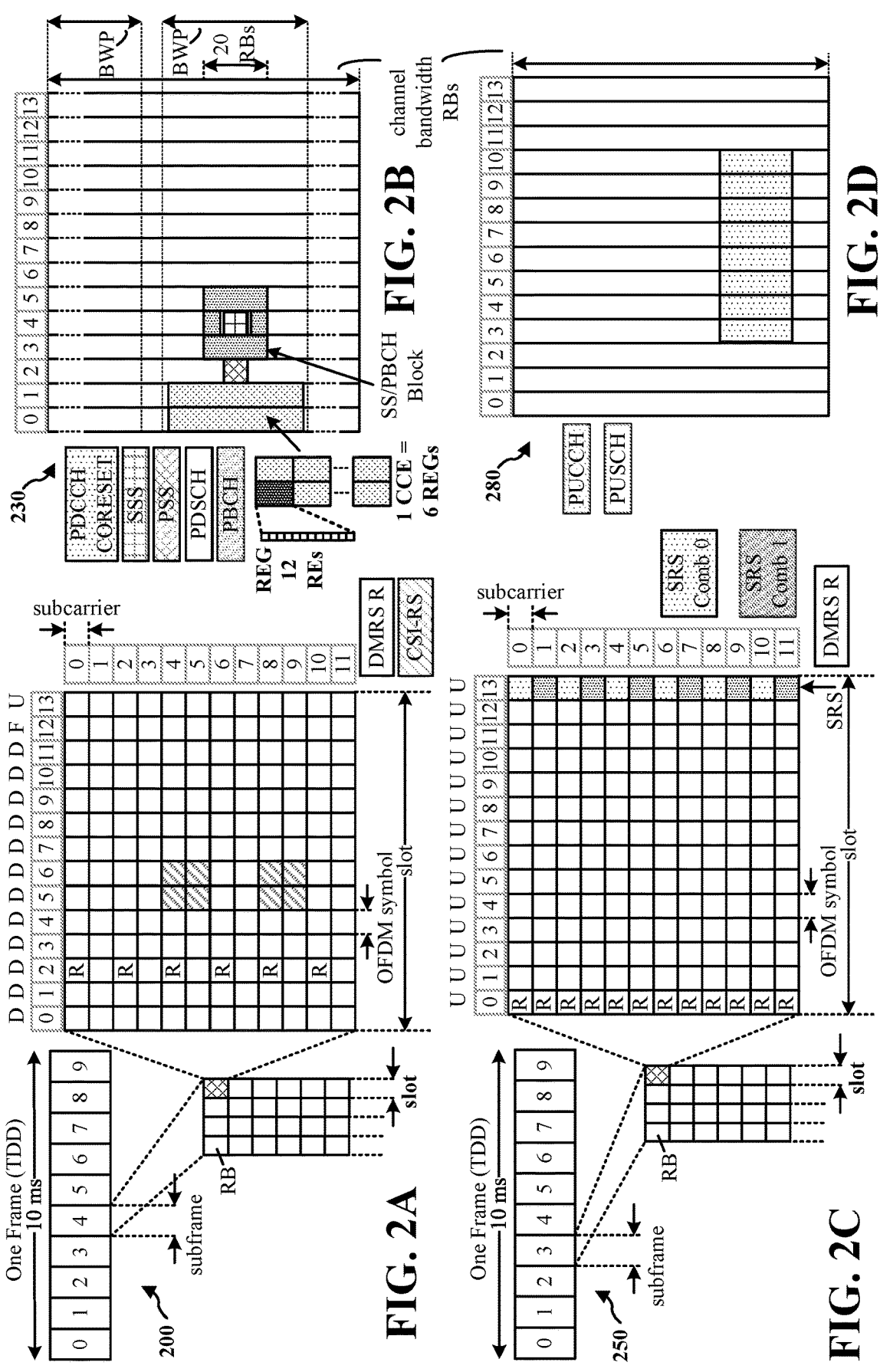
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu} \times 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
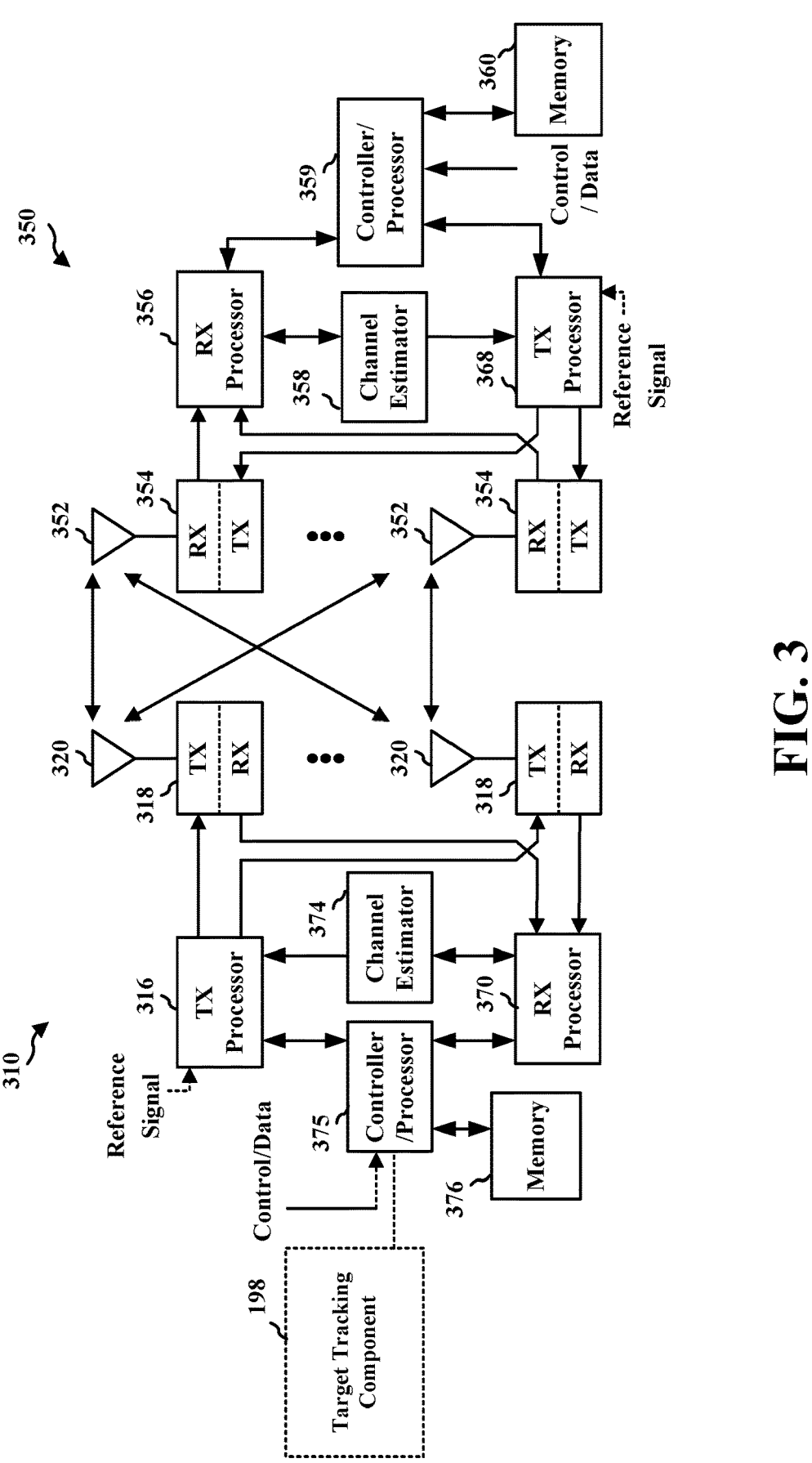
FIG. 3 is a diagram illustrating an example of a wireless device capable of sensing a radar signal.

FIG. 3 is a block diagram of a first wireless device 310 having components for wireless transmission. The wireless device 310 may be a radar device configured to perform the aspects presented herein. In some examples, the wireless device 310 may be capable of communication with another wireless device 350, e.g., based on sidelink and/or an access link, such as described in connection with FIG. 1. The wireless device 310 may include one or more antennas 320 may include a transmitter/receiver 318 with a corresponding transmit processor 316 and receive processor 370 that are configured to perform radar transmission and measurement, such as described in connection with FIGS. 4-5. The one or more antenna 320, transmitter/receiver 318, transmit processor 316, and receive processor 370 may transmit a radar signal and receive reflections of the radar signal. The controller/processor 375 may determine radio frequency (RF) sensing information about a target based on the received signal.

In some examples, the wireless device 310 may be capable of wireless communication in addition to RF sensing. For communication, packets may be provided to a controller/processor 375. The controller/processor 375 implements layer 3 and layer 2 functionality. The transmit (TX) processor 316 and the receive (RX) processor 370 implement layer 1 functionality associated with various signal processing functions. Different spatial streams may be provided to a different antenna 320 via a separate transmitter 318 TX. Each transmitter 318 TX may modulate an RF carrier with a respective spatial stream for transmission.

At the wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single stream, such as an OFDM symbol stream. The RX processor 356 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions may then be decoded and deinterleaved to recover the data and control signals that were originally transmitted by the wireless device 310 on the physical channel. The data and control signals may then be provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing to recover IP packets from the EPC 160. The controller/processor 359 may also be responsible for error detection using an ACK and/or NACK protocol to support HARQ operations.

Channel estimates derived by a channel estimator 358 from a reference signal or feedback transmitted by the wireless device may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The received transmission may be processed at the wireless device 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover packets from the wireless device 350. The controller/processor 375 may also be responsible for error detection using an ACK and/or NACK protocol to support HARQ operations.

At least one of the TX processor 316, the RX processor 370, or the controller/processor 375 may be configured to perform aspects in connection with the target tracking component 198 of FIG. 1 to adapt a radar transmission based on a congestion level.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
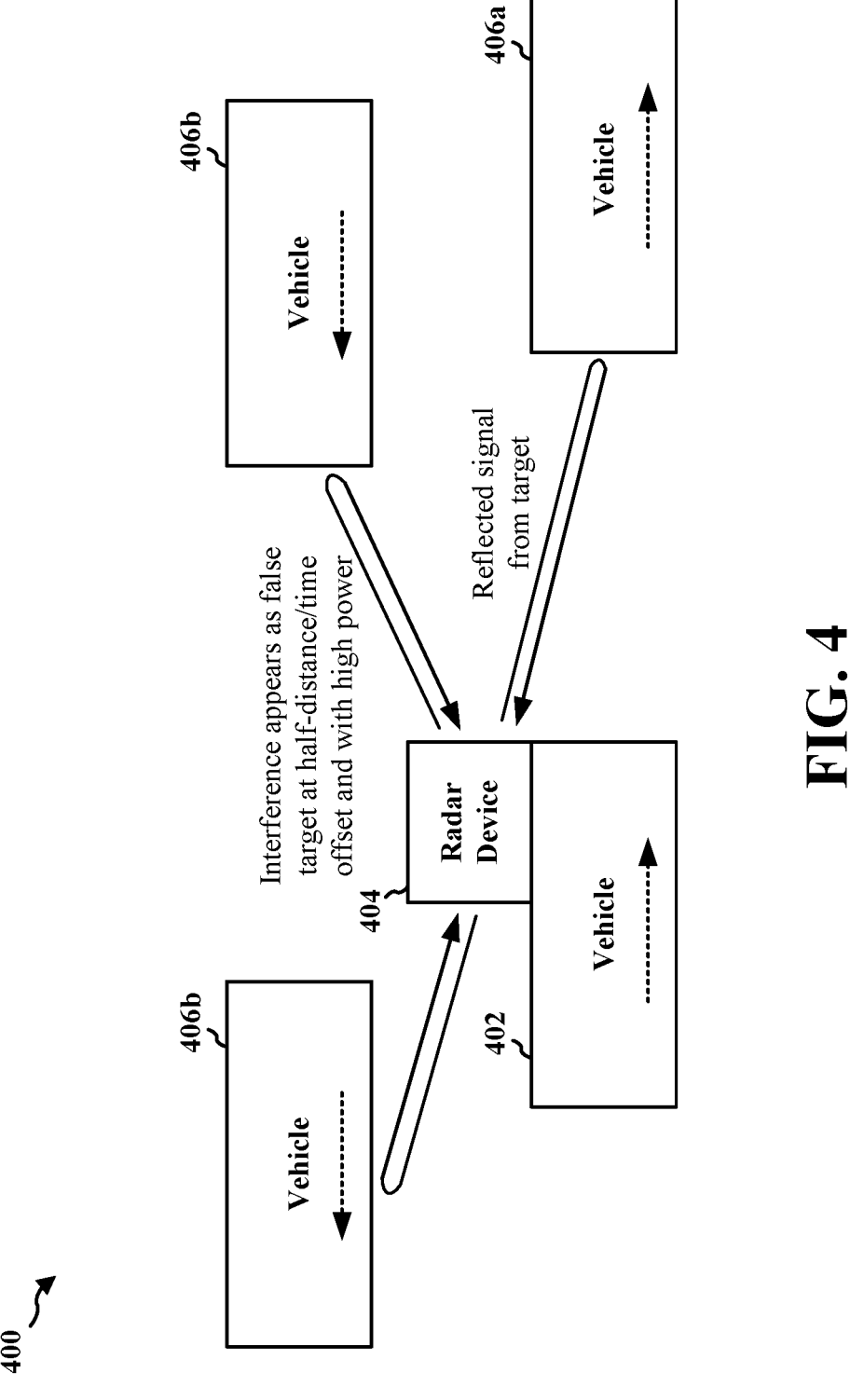
FIG. 4 is a diagram illustrating radar signals transmitted by a vehicle and reflected from a target and a false target.

FIG. 4 is a diagram 400 illustrating radar signals transmitted by a vehicle 402 and reflected from a target 406a and a false targets 406b. A ranging radar may be incorporated in the vehicle 402 for performing collision avoidance and other related techniques. Although FIG. 4 illustrates an example of a radar application for a vehicle, the aspects described in connection with FIG. 4 are similarly applicable to non-vehicular radar devices. Frequency modulated continuous wave (FMCW) radars that operate in a full duplex mode may be widely deployed in automobile applications. An FMCW radar may be configured to estimate a distance, a velocity, and/or a direction of a detected target (e.g., the targets 406a-406b). After the target is detected, the target may be continuously tracked by the FMCW radar and associated systems. Such radars and radar techniques may provide improved road safety measures and reduce automobile collisions.

A radar device 404 at the vehicle 402 may be configured to transmit a radar signal/pulse and receive a return signal based on a reflection of the radar signal from an object, which may be referred to as a target (e.g., the target 406a). The radar device 404 at the vehicle 402 may measure a time delay between transmission of the radar signal and reception of the return signal for determining a distance to the object from which the return signal was reflected. In some cases, a false target 406b may be detected based on an interfering radar signal from another radar device. The other radar device may be associated with a different vehicle (e.g., the false targets 406b). For example, the radar signal from the radar device 404 may be reflected from one or more of the false targets 406b and received by the radar device 404 at the vehicle 402 based on a shortened distance/time offset and with higher power. If the radar device 404 at the vehicle 402 is not able to distinguish the signal from the radar reflections of its own radar signal, the vehicle 402 may misinterpret the received signal and incorrectly measure the distance to the target 406a. The vehicle 402 may determine the presence of a false target 406b at an incorrect location based on the signal.

As a number of vehicles equipped with sensing devices, such as ranging radars, increases in a given area, the sensing devices may increasingly interfere with each other, as there may be no or little coordination among the sensing devices/radars. That is, other vehicles (e.g., the false targets 406b) may transmit radar signals independently of conditions associated with the radar device 404 of the vehicle 402. Therefore, the signal received by the radar device 404 of the vehicle 402 may include the return signal from the radar of the vehicle 402 or a different signal (e.g., interference) transmitted from a radar of the other vehicles (e.g., false targets 406b). Accordingly, multiple radar sources operating in proximity to each other may cause significant interference to other radars of the multiple radar sources. As certain radar waveforms, such as FMCW, received by the radar device 404 of the vehicle 402 may be signature-less, the radar return signal may be indistinguishable from the different radar signals transmitted from the multiple radar sources.

Figure 5:
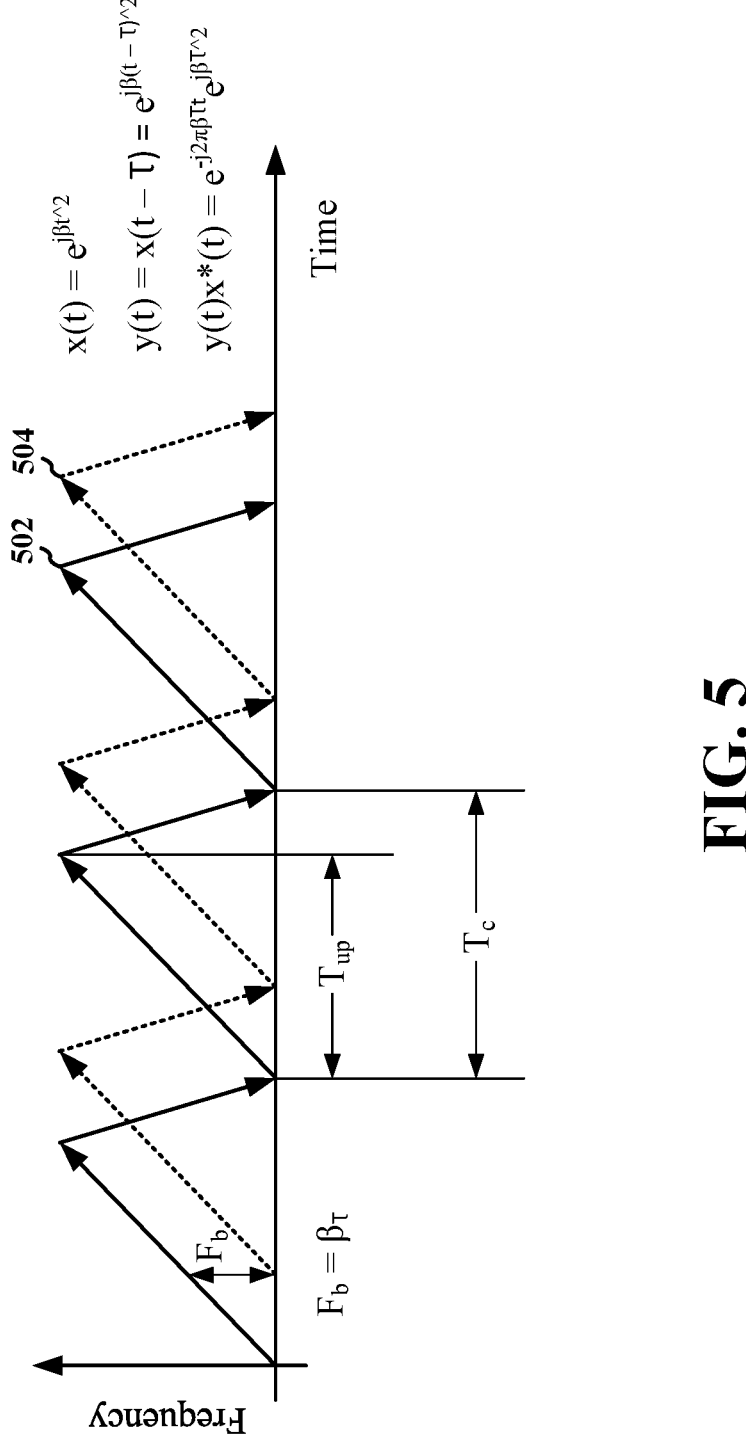
FIG. 5 is a diagram illustrating a transmitted signal and a return signal of a radar.

FIG. 5 is a diagram 500 that illustrates a transmitted signal 502 and a return signal 504 of a radar. The signals 502-504 may be associated with an FMCW waveform utilized by the radar for frequency sweeping. The transmitted signal 502 may correspond to an instantaneous frequency that increases from zero to a higher frequency and subsequently decreases from the higher frequency to zero based on a sinusoidal operation. Each sweep up and down may correspond to an individual pulse or chirp of the FMCW. A chirp time may be indicated by $T_c$ and a sweeping up time may be indicated by $T_{up}$. For instance, the frequency may sweep up from 77 GHz to 78 GHz to provide a sweeping bandwidth of 1 GHz. A time period that elapses for the sweeping up of the 1 GHz of bandwidth may correspond to $T_{up}$. After the radar sweeps up to 78 GHz, an additional/non-zero length of time may elapse for the radar to sweep down and return to 77 GHz. The additional/non-zero length of time may correspond to $T_{down}$. Thus, $T_{up}+T_{down}$ may equal $T_c$ (e.g., the duration of the chirp/pulse). In examples, the radar may be configured based on certain $T_c$ parameters.

The radar may receive a series of chirps via the return signal 504 that match the transmitted signal 502, albeit delayed based on a location of an object from which the return signal is reflected. As a distance between the radar and the object increases, the corresponding delay may become larger. The distance to the object may be determined based on determining the delay. For example, rather than directly measuring a time of the delay, a frequency delta between the transmitted signal 502 and the return signal 504 may be determined, where the frequency delta may be proportional to the delay. The range of the object may be further determined based on the delay being proportional to the range. The frequency delta may be associated with a range spectrum and a beat frequency ($F_b$) determined based on a Fast Fourier Transform (FFT). The beat frequency may correspond to a mixed output of the transmitted signal 502 and the return signal 504. A slope for sweeping up the frequency may be defined (e.g., 1 GHz per $T_{up}$ seconds), such that a rate at which the slope changes may correspond to a beta ($\beta$) parameter.

The parameters of the transmitted signal 502 and the return signal 504 may be indicative of a maximum (e.g., theoretical) detectable range of an FMCW receiver of the radar. For longer range radars, 100-300 m may be the maximum detectable range. The parameters may also be indicative of a maximum detectable speed/velocity (e.g., 30-40 m/s). For example, based on multiple received chirps, the velocity of the object may be determined based on a Doppler spectrum and a direction of the object may be determined based on a direction of arrival (DoA) spectrum. In examples, outputs such as $x(t)=e^{j\beta t^2}$; $y(t)=x(t-\tau)=e^{j\beta(t-\tau)^2}$; and/or $y(t)x^*(t)=e^{-j2\pi\beta\tau t}e^{j\beta T^2}$ may be determined based on the parameters of the FMCW waveform, where x corresponds to a transmitted chirp signal, y corresponds to a received chirp signal, t corresponds to time, j corresponds to $\sqrt{-1}$, and $\tau$ corresponds to a delay between a transmitted chirp and a received chirp. That is, three different frequency analyses may be performed to determine range, velocity, and/or direction.

Figure 6:
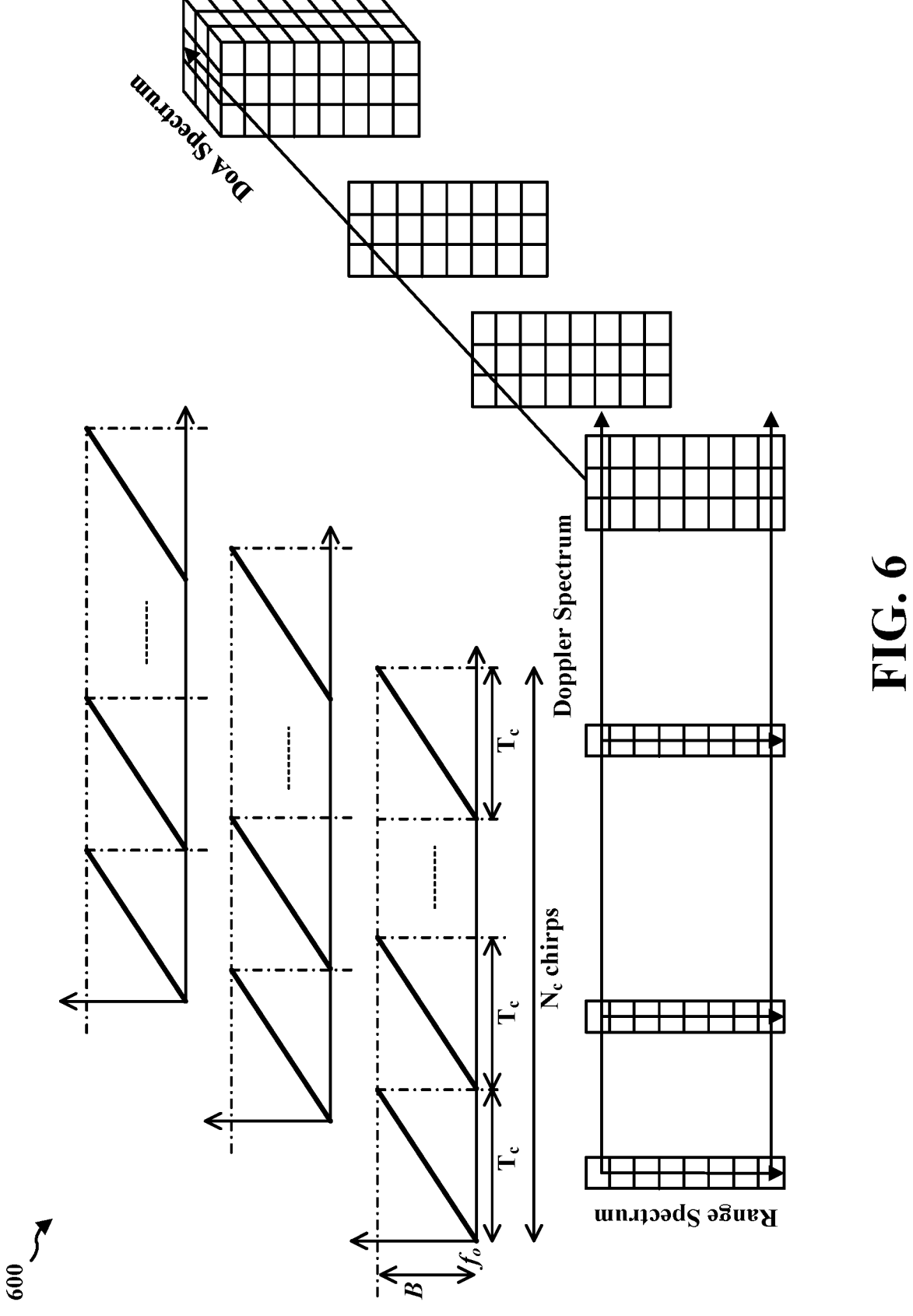
FIG. 6 is a diagram associated with a spectral analysis for a radar image.

FIG. 6 is a diagram 600 associated with a spectral analysis for a radar image. The spectral analysis may be based on a Doppler spectrum, a DoA spectrum, and a range spectrum. The spectral analysis may be further based on a number of chirps $N_c$ that each include a corresponding chirp time $T_c$ and a corresponding beta ($\beta$) parameter associated with the beat frequency $F_b$. Each chirp may begin at an initial frequency $f_o$.

The spectral analysis may be indicative of a Doppler spectrum that includes a phase shift over time. An angular domain may also be indicated by the spectral analysis, where the angular domain may correspond to the DoA spectrum. The range spectrum may include an azimuth and an elevation. The azimuth may correspond to depth portions of the diagram 600, whereas the elevation may correspond to the vertical portions of the diagram 600.

Each chirp of the number of chirps Ne may be based on the beat frequency $F_b$, which may be indicative of the range spectrum. A set of beat frequencies observed via the number of chirps $N_c$ may be derived from a time domain signal. A phase ramp over each of the chirp times $T_c$ may correspond to the Doppler spectrum. The Doppler spectrum per chirp may be determined based on the range spectrum. For example, an FFT may be performed across the range spectrum to determine the Doppler spectrum based on the phase ramp over time. Similarly, in the angular domain, a second FFT may be performed across the Doppler spectrum to determine the DoA spectrum. While FFT procedures may be performed in association with the spectral analysis, other types of procedures may be indicative of the Doppler spectrum, the DoA spectrum, and/or the range spectrum. In some instances, a 4-dimensional spectral analysis may be performed in cases that include multiple antennas in association with the elevation portion of the range spectrum.

The Doppler spectrum, the DoA spectrum, and the range spectrum associated with the diagram 600 may be indicative of a radar image. The radar image may include a plurality of bins. A target object corresponding to a particular range parameter and a particular Doppler parameter may reflect more energy in association with a particular bin of the radar image than a bin that is not associated with the target object.

Figure 7:
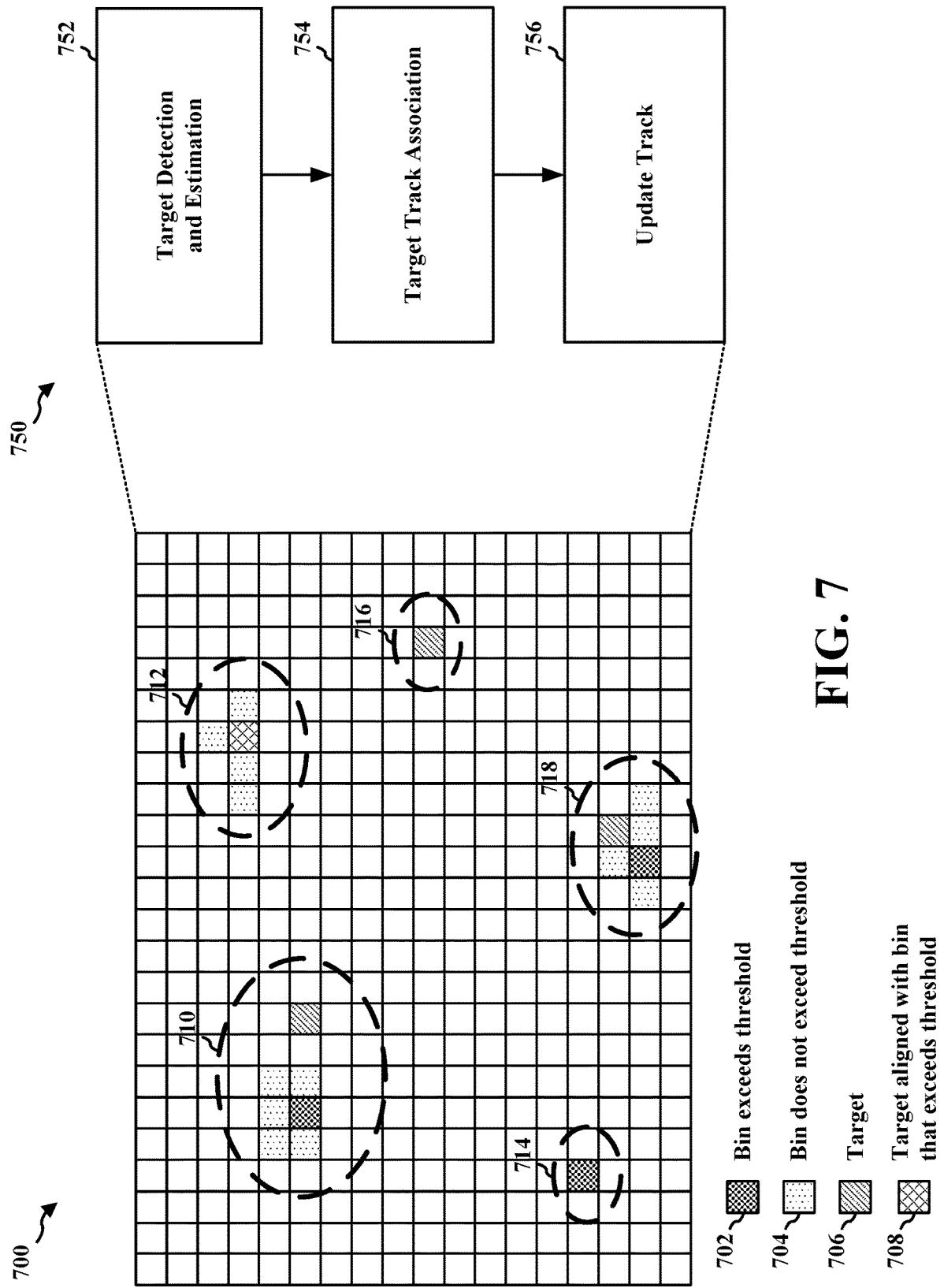
FIG. 7 illustrates a radar image diagram including a plurality of bins for target detection and tracking as well as a corresponding detection and tracking flow diagram.

FIG. 7 illustrates a radar image diagram 700 including a plurality of bins for target detection and tracking as well as a corresponding detection and tracking flow diagram 750. At 752, a radar may perform target detection and estimation. One or more actual targets (e.g., a target 706 and/or a target aligned with a bin 708 that exceeds a threshold signal strength) may correspond to one or more bins of the radar image diagram 700. The radar may estimate distance, velocity, DoA, etc., for each target 706/708 of the radar image diagram 700.

The radar image may be a 2-dimensional radar image. For example, the radar image may correspond to a range along a y-axis and an angle along an x-axis. The radar image diagram 700 may include actual targets, false targets, side lobes, misdetections, etc., based on observations of the radar. Four actual targets (e.g., 706/708) are indicated via the radar image diagram 700 at a first region 710, a second region 712, a fourth region 716, and a fifth region 718, respectively. A false target is indicated at a third region 714 of the radar image diagram 700. A false target refers to a radar detection that corresponds to a bin 702 that exceeds the threshold signal strength, but which the radar does not associate with an actual target (e.g., 706/708). Side lobes (e.g., indicated via a bin 704 that does not exceed the threshold signal strength) are included in the first region 710, the second region 712, and the fifth region 718. A misdetection occurs at the fourth region 716 of the radar image diagram 700. Misdetection refers to a target that was being tracked by the radar, but was not observed by the radar in the radar image.

The first region 710 of the radar image diagram 700 may include a first detected observation associated with a first target, but with errors. For example, the first detected observation may be shifted from the actual location of the first target. The second region 712 of the radar image diagram 700 may include a second detected observation that is aligned with the actual location of the second target. For example, the second detected observation and the second target may correspond to a same bin of the radar image. The third region 714 of the radar image diagram 700 may correspond to a false target. That is, the radar may have sensed a third detected observation, but the third detected observation is not associated with an actual target (e.g., 706/708). The fourth region 716 of the radar image diagram 700 may correspond to a misdetection. For instance, an actual target associated with the radar image diagram 700 may not have been detected by the radar. The fifth region 718 of the radar diagram 700 includes similar features to the first region 710 of the radar image diagram 700.

At 754, the radar may perform target track association. For example, the radar may associate the targets 706/708 to predetermined tracks/trajectories. When the radar is tracking a plurality of targets 706/708, the radar may determine one or more detected observations (e.g., bins 702 that exceed the threshold signal strength) in the radar image to be respectively associated with the plurality of targets 706/708. For instance, the radar may determine that the closest detected observation/bin to a target 706/708 is to be associated with the target 706/708. Thus, the radar may determine that a target 706/708 corresponds to a particular track.

The radar may also determine false targets (e.g., at the third region 714). A bin/region that is not associated with a target 706/708 may correspond to a false target, particularly if all of the targets 706/708 have been associated with other tracks. In such cases, the radar may determine that the detected observation is a false target, or that the detected observation may potentially correspond to a new target and that the detected observation should be updated based on future radar images. However, the detected observation may be indicated as a false target unless/until the radar confirms that a new target is detected.

The radar may further determine which targets are missing. A target that is not associated with any detected observations (e.g., at the fourth region 716) may correspond to a misdetected target. The radar may likewise determine which tracks are to be no longer maintained. For example, the misdetected target at the fourth region 716 may no longer be located in a field of view of the radar based on the lack of a detected observation for the misdetected target. Such inferences may be based on further observations from future radar images to confirm that the track is to be no longer maintained by the radar. Additionally, the radar may determine whether any new tracks are to be established. For example, the false target at the third region 714 may be subsequently associated with an actual target (e.g., 706/708) based on future observations/radar images.

At 756, the radar may perform a track update. The track update, at 756, may be based on one or more of the target track association, at 754, a target distance, a target velocity, a target DoA, etc. For example, the track may be updated, at 756, after the radar performs the associations, at 754, in the radar image between the detected observations and the actual targets (e.g., 706/708). Accordingly, the radar may receive per frame radar images based on Doppler, DoA, and/or range (e.g., in elevation/azimuth), and perform target tracking based on the radar images. Thus, a set of observations in a radar image frame may be mapped to one or more targets 706/708.

Target tracking techniques may be based on a bin location of a target 706/708. The bin may be indicative of distance, velocity, DoA, etc., of the target 706/708. In some cases, a received signal strength associated with the bin may be used for target detection, at 752, but not for target track association, at 754. The radar image diagram 700 illustrates that some bins (e.g., 702) correspond to a received signal strength that exceeds a threshold, while other bins (e.g., 704) correspond to a received signal strength that does not exceed the threshold. If the signal strength of a bin 702 exceeds the threshold, the bin 702 may be associated with a target 706/708. If the signal strength of a bin 704 does not exceed the threshold, the bin 704 may not be associated with a target 706/708. Thus, the radar may make a binary determination with respect to whether the bin is associated with a target 706/708 based on the received signal strength. However, the received signal strength for each bin may be used more broadly in other applications to perform target tracking association, at 754.

In cases where bin strength information is not discarded by the radar, a false target may be erroneously identified as an actual target and associated with a track, at 754, if the received signal strength passes a detection threshold. However, a passing indication may correspond to a sudden jump in signal strength that is not indicative of an actual target. The received signal strength in a particular direction/particular bin may not be expected to fluctuate by a significant amount over a short period of time, although the received signal strength may be expected to change slightly. If the radar detects two consecutive false targets within a same proximity and with much different received signal strengths, but does not account for the differences in the received signal strengths, the radar may incorrectly identify the detections as an actual target and begin tracking a false target. That is, the radar may be checking for consistency in the range and Doppler, but not checking for consistency of the received signal strength. Additionally, a real/actual target that suddenly changes in distance, velocity, DoA, etc., (e.g., motion of another vehicle is stopped due to collision) may fail target track association, at 754, if the received signal strength is not considered by the radar and the radar may stop tracking the target. Determining the bin strength associated with a target object may provide improved confidence for target track association, at 754.

As FMCW radars become more widely deployed, inter-radar interference, and hence false target detections, may occur more frequently. False detections and misdetections may not be as common when 1 radar is located in an environment, but when multiple radars are included in the environment that are transmitting at the same time, the multiple radars may generate interference for each other. Interference from other radars may correspond to noise that makes false detections and misdetections more likely to occur. Thus, a reliability of target tracking techniques may be decreased. For example, the radar may initiate a track that does not correspond to a real/actual target, or the radar may discard a track because the radar has misdetected the real/actual target so frequently. Accordingly, the return signal strength of the radar may include information to make target tracking more robust in the presence of multi-radar interference.

The target bin strength may be included as an input to a tracking module to increase a reliability of target track association procedures. In examples, a filtered signal strength may be used for target track association, at 754. The filtered signal strength may correspond to overall quantities associated with target detection, at 752, rather than per instant quantities. For example, a velocity x and y or an acceleration a and b may correspond to filtered quantities that are based on a plurality of radar observations/radar images. The values of the filtered quantities may be updated (e.g., at 756) via each observation performed by the radar. Hence, a target tracking filter may predict a state of the target 706/708 (e.g., location, velocity, acceleration, etc.) based a plurality of observations/radar images. In further examples, the received signal strength may be a state parameter given that the radar is evaluating consistencies of the received signal strength in a similar manner to the consistencies evaluated for other state parameters, such as x and y velocity values.

Target tracking filters may be based on state space equations that include parameters indicative of the state of the target 706/708. The state space equations may be used to predict the manner in which the state of the target 706/708 may be expected to change. The received signal strength may be associated with +/−a certain level of noise, but any such variation in the received signal strength may not exceed a determined threshold relative to the filtered signal strength. Thus, when the radar receives an observation, the radar may expect the observation to correspond to state parameters that are within the determined threshold.

The radar may exclude detections indicative of received signal strengths that vary beyond the determined threshold that is relative to the filtered signal strength. The target 706/708 may be associated with a number of parameters for target track association, at 754. For example, the radar may determine the location of the target 706/708, the range Doppler, the velocity of the target 706/708, the angle of the target 706/708, the acceleration of the target 706/708 in a particular direction, etc. If the received signal strength of a tracked target 706/708 is changing significantly over time (e.g., beyond expected variations within the determined threshold), the observation may correspond to a false target. For example, if the angle of the target 706/708 has not changed significantly, the radar may not expect the received signal strength to suddenly increase/decrease significantly or randomly make significant jumps/changes multiple times over multiple radar frames. Thus, the determination of whether the detection corresponds to a false target may not occur over just two frames but, based on filtering procedures, may be determined over time based on inconsistent shifts above or below the determined threshold relative to the filtered signal strength.

The determined threshold may be used for reducing false target detections. In some cases, the threshold may be set conservatively based on a maximum change in a radar cross section of a target 706/708, which may be caused via rotation, deformation, scattering, etc. While a profile of the target 706/708 may change as the target 706/708 moves, such changes may not correspond to large or random variations in the received signal strength. That is, variations in the received signal strength may occur more gradually over time as the profile of an object changes, such that the determined threshold may be based on an expected maximum change in the radar cross section. The radar cross section may correspond to an amount of energy that may be reflected back to the radar. If the target 706/708 has a small cross section, the target 706/708 may reflect less energy back to the radar than a different target with a larger cross section. In this manner, the radar may determine whether an observation corresponds to a real target when the threshold is exceeded.

The determined threshold may also be based on a maximum antenna gain change and/or a maximum pathloss change. If a target 706/708 moves from a first angle to a second angle, a gain change in the antenna pattern of the radar may occur based on the changes in the angular direction of the target 706/708. The pathloss change may be based on moving from a first location to a second location. The threshold may also be based on a receiver automatic gain control (AGC) setting change and/or a signal processing gain change, which may correspond to $P_{rx}=P_{tx}+G_{tx}+G_{rx}+RCS-30\log_{10}(4\pi)-40\log_{10}R$, where $P_{rx}$ corresponds to a receive pathloss, $P_{tx}$ corresponds to a transmit pathloss, $G_{tx}$ corresponds to a transmit antenna gain, $G_{rx}$ corresponds to a receive antenna gain, RC'S corresponds to a radar cross section, and R corresponds to a range. In examples, the range may be changing, the radar cross section (RCS) may be changing based on a rotation of the target 706/708 (e.g., within some reasonable/expected limits), the gains may be changing based on the change in the angle of the target 706/708, etc. The radar may determine, based on a time interval, whether the parameters are changing beyond a certain number of decibels (dBs). If so, the radar may determine that a false detection has occurred.

If the received signal strength matches, or is close to matching, the filtered signal strength, there may be an increased likelihood that target track association (e.g., at 754) should be performed. For example, based solely on the received signal strength changing too significantly, the radar may determine to discard the detections as false detections. However, if increased noise and/or interference causes an increased number of errors in detections of the radar, a comparison between the received signal strength and the filtered signal strength may increase a reliability of target track association, at 754. For example, the bin associated with the first detected observation may be shifted from an actual location of the first target based on the increased noise and/or interference. In cases where the radar might otherwise determine that the first detected observation and the first target correspond to different targets (e.g., because the target 706/708 may just be expected to shift by a certain amount), the radar may instead associate the first detected observation with the first target based on a comparison of the signal strengths. Thus, signal strength may be included as an observable parameter for evaluating a likelihood of target association.

FIG. 8 is a flowchart 800 of a method of wireless communication at a wireless device. The wireless device may be the radar device 103/404; the wireless device 310; the vehicle 402; an apparatus 1002 (e.g., a vehicular radar or a non-vehicular radar); etc. The method may be performed to increase a reliability of target track association.

At 802, the wireless device may measure a received signal strength of a detected signal—the received signal strength is associated with at least one bin of a radar image. For example, referring to FIGS. 4 and 7, the radar device 404 may measure a reflected signal from a target 406a. The reflected signal may be indicative of a first bin in the radar image diagram 700 that exceeds a signal strength threshold (e.g., bin 702) or a second bin in the radar image diagram 700 that does not exceed the signal strength threshold (e.g., bin 704). The measurement, at 802, may be performed by the measurement component 1040 of the apparatus 1002 in FIG. 10.

At 804, the wireless device may compare the received signal strength to a filtered signal strength—the filtered signal strength is associated with a threshold difference in signal strength from the filtered signal strength. For example, referring to FIGS. 4 and 7, the radar device 404 may compare the signal strength of the reflected signal from the target 406a to a threshold signal strength to determine whether a bin exceeds the threshold signal strength (e.g., bin 702) or whether the bin does not exceed the threshold signal strength (e.g., bin 704). The threshold signal strength in the radar image diagram 700 may be relative to a filtered determined based on a plurality of radar images/data observed over time. The comparison, at 804, may be performed by the comparison component 1042 of the apparatus 1002 in FIG. 10.

At 806, the wireless device may track the at least one bin of the radar image in response to the received signal strength being less than or equal to the threshold difference in signal strength from the filtered signal strength. For example, referring to FIG. 7, the filtered signal strength may correspond to an expected signal strength of a target 706/708. If the received signal strength for a bin (e.g., detected at 752) does not exceeds+/−some threshold difference in signal strength from the filtered signal strength, target track association may be performed, at 754, with respect to the bin. The tracking, at 806, may be performed by the tracker component 1050 of the apparatus 1002 in FIG. 10.

FIG. 9 is a flowchart 900 of a method of wireless communication at a wireless device. The wireless device may be the radar device 103/404; the wireless device 310; the vehicle 402; an apparatus 1002 (e.g., a vehicular radar or a non-vehicular radar); etc. The method may be performed to increase a reliability of target track association.

At 902, the wireless device may measure a received signal strength of a detected signal—the received signal strength is associated with at least one bin of a radar image. For example, referring to FIGS. 4 and 7, the radar device 404 may measure a reflected signal from a target 406a. The reflected signal may be indicative of a first bin in the radar image diagram 700 that exceeds a signal strength threshold (e.g., bin 702) or a second bin in the radar image diagram 700 that does not exceed the signal strength threshold (e.g., bin 704). The received signal strength of the detected signal may correspond to a state parameter for a target object (e.g., target 706/708). The measurement, at 902, may be performed by the measurement component 1040 of the apparatus 1002 in FIG. 10.

At 904, the wireless device may compare the received signal strength to a filtered signal strength—the filtered signal strength is associated with a threshold difference in signal strength from the filtered signal strength. For example, referring to FIGS. 4 and 7, the radar device 404 may compare the signal strength of the reflected signal from the target 406a to a threshold signal strength to determine whether a bin exceeds the threshold signal strength (e.g., bin 702) or whether the bin does not exceed the threshold signal strength (e.g., bin 704). The threshold signal strength in the radar image diagram 700 may be relative to a filtered determined based on a plurality of radar images/data observed over time. The filtered signal strength may correspond to an expected strength of the reflected signal from the target 406a, the expected strength of the reflected signal may be based on a plurality of received signal strength measurements. The filtered signal strength may be updated based on each received signal strength measurement of the plurality of received signal strength measurements. The comparison, at 904, may be performed by the comparison component 1042 of the apparatus 1002 in FIG. 10.

At 906, the wireless device may indicate the received signal strength associated with the at least one bin of the radar image to a tracking module that tracks the at least one bin of the radar image. For example, referring to FIGS. 4 and 7, the radar device 404 may indicate the received signal strength of the reflected signal from the target 406a for target detection, at 752, to perform target track association, at 754. The indication, at 906, may be performed by the indication component 1044 of the apparatus 1002 in FIG. 10.

At 908, the wireless device may determine whether the received signal strength is less than or equal to the threshold difference in signal strength based on the comparison of the received signal strength to the filtered signal strength. For example, referring to FIGS. 4 and 7, the radar device 404 may determine whether a bin of the radar image diagram 700 is a bin 702 that exceeds a signal strength threshold or a bin 704 that does not exceed the signal strength threshold. The determination, at 908, may be performed by the determination component 1046 of the apparatus 1002 in FIG. 10.

At 910, the wireless device may exclude the at least one bin of the radar image from being tracked in response to the received signal strength being greater than the threshold difference in signal strength from the filtered signal strength. For example, referring to FIG. 7, the filtered signal strength may correspond to an expected signal strength of a target 706/708. If the received signal strength for a bin (e.g., detected at 752) exceeds+/−some threshold difference in signal strength from the filtered signal strength, the bin may be excluded from target track association, at 754. The exclusion, at 910, may be performed by the exclusion component 1048 of the apparatus 1002 in FIG. 10.

At 912, the wireless device may track the at least one bin of the radar image in response to the received signal strength being less than or equal to the threshold difference in signal strength from the filtered signal strength. For example, referring to FIG. 7, the filtered signal strength may correspond to an expected signal strength of a target 706/708. If the received signal strength for a bin (e.g., detected at 752) does not exceeds+/−some threshold difference in signal strength from the filtered signal strength, target track association may be performed, at 754, with respect to the bin. The tracking, at 912, may be performed by the tracker component 1050 of the apparatus 1002 in FIG. 10.

At 914, the wireless device may determine a number of instances over time that the received signal strength associated with the at least one bin is less than or equal to the threshold difference in signal strength. For example, referring to FIG. 7, the radar image diagram 700 may correspond to one of a plurality of radar images that include at least one bin having a signal strength that is less than or equal to the threshold difference in signal strength. The number of instances over time that the received signal strength is associated with the at least one bin that is less than or equal to the threshold difference in signal strength may be based on the radar image diagram 700 and/or the plurality of radar images generated over time. Further, the tracking, at 912, of the at least one bin in response to the received signal strength being less than or equal to the threshold difference in signal strength may be based on the determined number of instances over time. The determination, at 914, may be performed by the determination component 1046 of the apparatus 1002 in FIG. 10.

At 916, the wireless device may adjust the threshold difference in signal strength from a previous threshold difference in signal strength associated with a previous radar image based on a change of at least one parameter. For example, referring to FIG. 7, the radar image diagram 700 may correspond to one of a plurality of radar images indicative of received signal strength information. A threshold difference in signal strength from the filtered signal strength in the radar image diagram 700 may be adjusted from a previous one of the plurality of radar images (e.g., based on a changed parameter). In a further example, the radar image diagram 700 may correspond to the previous radar image, such that the threshold difference in signal strength from the filtered signal strength for a subsequent radar image may be adjusted from the radar image diagram 700 (e.g., based on a changed parameter). The adjustment, at 916, may be performed by the adjustment component 1052 of the apparatus 1002 in FIG. 10.

The at least one parameter may correspond to a radar cross section of a target 706/708, and the change of the least one parameter may correspond to a number of bins for the target 706/708 indicated via the detected signal (e.g., used, at 752, for target detection and estimation). The at least one parameter may correspond to a maximum antenna gain, and the change of the at least one parameter may correspond to an angle (e.g., corresponding to the DoA spectrum in the diagram 600) associated with the detected signal (e.g., used, at 752, for target detection and estimation). The at least one parameter may correspond to a maximum path loss, and the change of the at least one parameter may correspond to a location associated with the detected signal (e.g., used, at 752, for target detection and estimation). The change of the at least one parameter may correspond to one or more of a receiver AGC configuration or a signal processing gain. The change of the at least one parameter may be based on $P_{rx}=P_{tx}+G_{tx}+G_{rx}+RCS-30 \log_{10} (4\pi)-40 \log_{10} R$, where $P_{rx}$ corresponds to a receive pathloss, $P_{tx}$ corresponds to a transmit pathloss, $G_{tx}$ corresponds to a transmit antenna gain, $G_{rx}$ corresponds to a receive antenna gain, RCS corresponds to a radar cross section, and R corresponds to a range.

Figure 10:
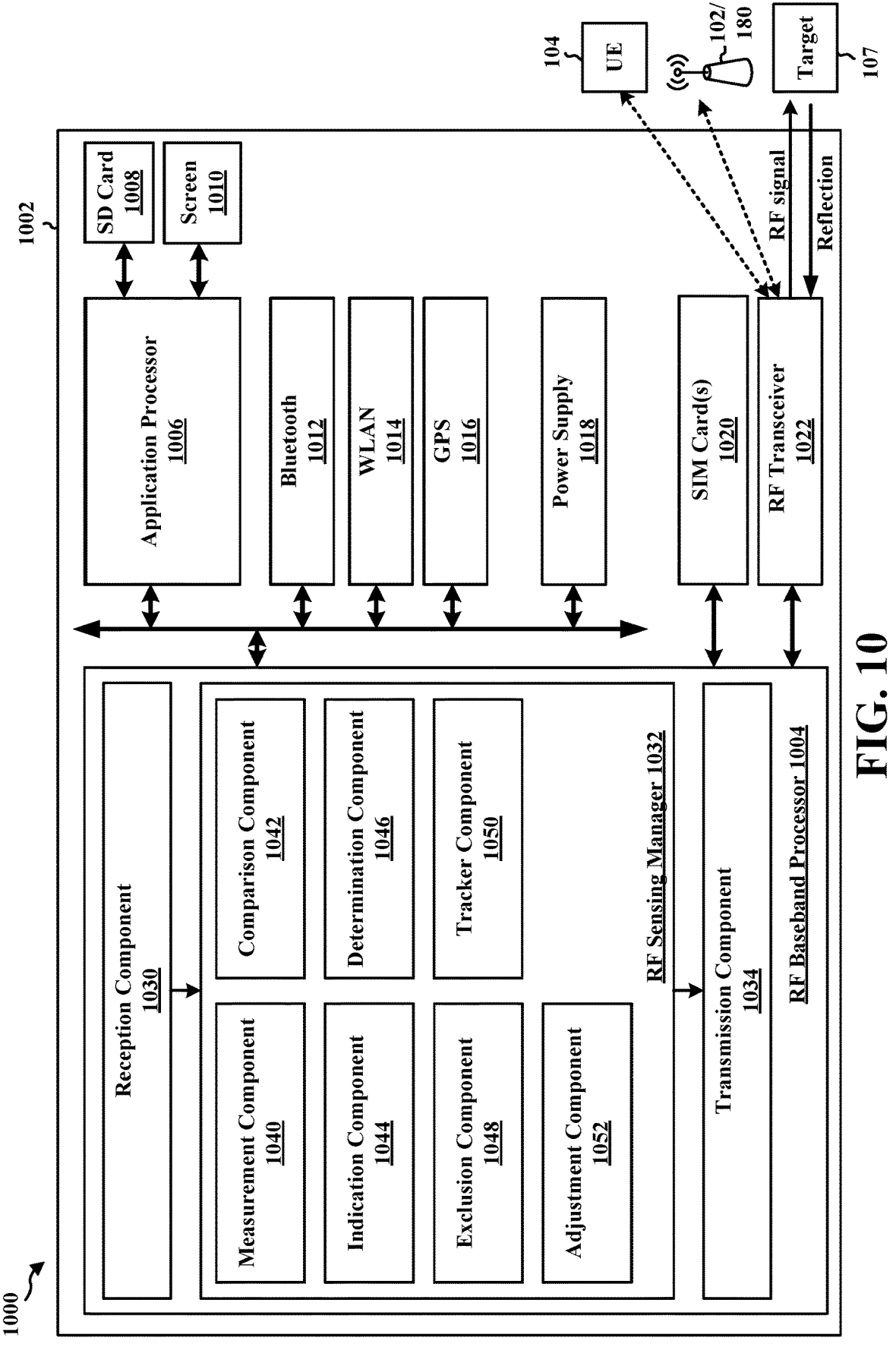
FIG. 10 is a diagram illustrating an example of a hardware implementation for an example apparatus.

FIG. 10 is a diagram 1000 illustrating an example of a hardware implementation for an apparatus 1002. The apparatus 1002 is a radar signal sensing device and includes an RF baseband processor 1004 (also referred to as a modem) coupled to an RF transceiver 1022. In some examples, the apparatus may be capable of wireless communication in addition to radar signal sensing. For example, the apparatus may be a radar device, a UE, a base station, or another access point that is capable of radar signal sensing. If the radar signal sensing device is a UE, the processor may be coupled to one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the RF transceiver 1022 with the UE 104 and/or BS 102/180. The RF baseband processor 1004 may include a computer-readable medium/memory. The computer-readable medium/memory may be non-transitory. The RF baseband processor 1004 is responsible for general processing, including the execution of software stored on the computer-readable medium/memory. The software, when executed by the RF baseband processor 1004, causes the RF baseband processor 1004 to perform the various functions described supra. The computer-readable medium/memory may also be used for storing data that is manipulated by the RF baseband processor 1004 when executing software. The RF baseband processor 1004 further includes a reception component 1030, an RF sensing manager 1032, and a transmission component 1034. The RF sensing manager 1032 includes the one or more illustrated components. The components within the RF sensing manager 1032 may be stored in the computer-readable medium/memory and/or configured as hardware within the RF baseband processor 1004. The cellular baseband processor 1004 may be a component of the wireless device 350 and may include the memory 360 and/or at least one of the TX processor 368, the RX processor 356, and the controller/processor 359. In one configuration, the apparatus 1002 may be a modem chip and include just the RF baseband processor 1004, and in another configuration, the apparatus 1002 may be the entire RF sensing device (e.g., radar device 103) and include the additional modules of the apparatus 1002.

The RF sensing manager 1032 may include a measurement component 1040 that is configured, e.g., as described in connection with 802 and 902, to measure a received signal strength of a detected signal—the received signal strength is associated with at least one bin of a radar image. The RF sensing manager 1032 may further include a comparison component 1042 that is configured, e.g., as described in connection with 804 and 904, to compare the received signal strength to a filtered signal strength—the filtered signal strength is associated with a threshold difference in signal strength from the filtered signal strength. The RF sensing manager 1032 may further include an indication component 1044 that is configured, e.g., as described in connection with 906, to indicate the received signal strength associated with the at least one bin of the radar image to a tracking module that tracks the at least one bin of the radar image. The RF sensing manager 1032 may further include a determination component 1046 that is configured, e.g., as described in connection with 908 and 914, to determine whether the received signal strength is less than or equal to the threshold difference in signal strength based on the comparison of the received signal strength to the filtered signal strength; and to determine a number of instances over time that the received signal strength associated with the at least one bin is less than or equal to the threshold difference in signal strength. The RF sensing manager 1032 may further include an exclusion component 1048 that is configured, e.g., as described in connection with 910, to exclude the at least one bin of the radar image from being tracked in response to the received signal strength being greater than the threshold difference in signal strength from the filtered signal strength. The RF sensing manager 1032 may further include a tracker component 1050 that is configured, e.g., as described in connection with 806 and 912, to track the at least one bin of the radar image in response to the received signal strength being less than or equal to the threshold difference in signal strength from the filtered signal strength. The RF sensing manager 1032 may further include an adjustment component 1052 that is configured, e.g., as described in connection with 916, to adjust the threshold difference in signal strength from a previous threshold difference in signal strength associated with a previous radar image based on a change of at least one parameter.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the RF baseband processor 1004, includes means for measuring a received signal strength of a detected signal, the received signal strength associated with at least one bin of a radar image; means for comparing the received signal strength to a filtered signal strength, the filtered signal strength associated with a threshold difference in signal strength from the filtered signal strength; and means for tracking the at least one bin of the radar image in response to the received signal strength being less than or equal to the threshold difference in signal strength from the filtered signal strength. The apparatus 1002 further includes means for excluding the at least one bin of the radar image from being tracked in response to the received signal strength being greater than the threshold difference in signal strength from the filtered signal strength. The apparatus 1002 further includes means for determining a number of instances over time that the received signal strength associated with the at least one bin is less than or equal to the threshold difference in signal strength, where tracking the at least one bin in response to the received signal strength being less than or equal to the threshold difference in signal strength is based on the determined number of instances over time. The apparatus 1002 further includes means for determining whether the received signal strength is less than or equal to the threshold difference in signal strength based on the comparison of the received signal strength to the filtered signal strength. The apparatus 1002 further includes means for indicating the received signal strength associated with the at least one bin of the radar image to a tracking module that tracks the at least one bin of the radar image. The apparatus 1002 further includes means for adjusting the threshold difference in signal strength from a previous threshold difference in signal strength associated with a previous radar image based on a change of at least one parameter.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a wireless device including at least one processor coupled to a memory and configured to measure a received signal strength of a detected signal, the received signal strength associated with at least one bin of a radar image; compare the received signal strength to a filtered signal strength, the filtered signal strength associated with a threshold difference in signal strength from the filtered signal strength; and track the at least one bin of the radar image in response to the received signal strength being less than or equal to the threshold difference in signal strength from the filtered signal strength.

Aspect 2 may be combined with aspect 1 and includes that the at least one processor is further configured to exclude the at least one bin of the radar image from being tracked in response to the received signal strength being greater than the threshold difference in signal strength from the filtered signal strength.

Aspect 3 may be combined with any of aspects 1-2 and includes that the filtered signal strength corresponds to an expected strength of a reflected signal from a target object, the expected strength of the reflected signal based on a plurality of received signal strength measurements.

Aspect 4 may be combined with any of aspects 1-3 and includes that the filtered signal strength is updated based on each received signal strength measurement of the plurality of received signal strength measurements.

Aspect 5 may be combined with any of aspects 1-4 and includes that the at least one processor is further configured to determine a number of instances over time that the received signal strength associated with the at least one bin is less than or equal to the threshold difference in signal strength, where tracking the at least one bin in response to the received signal strength being less than or equal to the threshold difference in signal strength is based on the determined number of instances over time.

Aspect 6 may be combined with any of aspects 1-5 and includes that the at least one processor is further configured to determine whether the received signal strength is less than or equal to the threshold difference in signal strength based on the comparison of the received signal strength to the filtered signal strength.

Aspect 7 may be combined with any of aspects 1-6 and includes that the at least one processor is further configured to indicate the received signal strength associated with the at least one bin of the radar image to a tracking module that tracks the at least one bin of the radar image.

Aspect 8 may be combined with any of aspects 1-7 and includes that the received signal strength of the detected signal corresponds to a state parameter for a target object.

Aspect 9 may be combined with any of aspects 1-8 and includes that the at least one processor is further configured to adjust the threshold difference in signal strength from a previous threshold difference in signal strength associated with a previous radar image based on a change of at least one parameter.

Aspect 10 may be combined with any of aspects 1-9 and includes that the at least one parameter corresponds to a RCS of a target object, and the change of the least one parameter corresponds to a number of bins for the target object indicated via the detected signal.

Aspect 11 may be combined with any of aspects 1-10 and includes that the at least one parameter corresponds to a maximum antenna gain, and the change of the at least one parameter corresponds to an angle associated with the detected signal.

Aspect 12 may be combined with any of aspects 1-11 and includes that the at least one parameter corresponds to a maximum path loss, and the change of the at least one parameter corresponds to a location associated with the detected signal.

Aspect 13 may be combined with any of aspects 1-12 and includes that the change of the at least one parameter corresponds to one or more of a receiver AGC configuration or a signal processing gain.

Aspect 14 may be combined with any of aspects 1-13 and includes that the change of the at least one parameter is based on $P_{rx}=P_{tx}+G_{tx}+G_{rx}+RCS-30 \log_{10}(4\pi)-40 \log_{10} R$, where $P_{rx}$ corresponds to a receive pathloss, $P_{tx}$ corresponds to a transmit pathloss, $G_{tx}$ corresponds to a transmit antenna gain, $G_{rx}$ corresponds to a receive antenna gain, RCS corresponds to a radar cross section, and R corresponds to a range.

Aspect 15 may be combined with any of aspects 1-14 and further includes a transceiver coupled to the at least one processor.

Aspect 16 is a method of wireless communication for implementing any of aspects 1-15.

Aspect 17 is an apparatus for wireless communication including means for implementing any of aspects 1-15.

Aspect 18 is a computer-readable medium storing computer executable code, the code in response to being executed by at least one processor causes the at least one processor to implement any of aspects 1-15.

What is claimed is:

1. An apparatus for wireless communication at a wireless device, comprising:
memory; and
at least one processor coupled to the memory and configured to:
measure a received signal strength of a detected signal, the received signal strength associated with at least one bin of a radar image;
compare the received signal strength to a filtered signal strength, wherein the filtered signal strength is based on a plurality of received signal strength measurements associated with a target object, wherein each received signal strength measurement of the plurality of received signal strength measurements is associated with a discrete radar image of a plurality of radar images, wherein the filtered signal strength is associated with a threshold difference in signal strength; and
track the at least one bin of the radar image based on a difference between the received signal strength and the filtered signal strength being less than or equal to the threshold difference in signal strength.

2. The apparatus of claim 1, wherein the at least one processor is further configured to:
exclude the at least one bin of the radar image from being tracked based on the difference between the received signal strength and the filtered signal strength being greater than the threshold difference in signal strength.

3. The apparatus of claim 1, wherein the filtered signal strength corresponds to an expected strength of a reflected signal from the target object, the expected strength of the reflected signal based on the plurality of received signal strength measurements.

4. The apparatus of claim 3, wherein the at least one processor is further configured to:

update the filtered signal strength based on each received signal strength measurement of the plurality of received signal strength measurements.

5. The apparatus of claim 1, wherein the at least one processor is further configured to:

determine a number of instances over time that the difference between the received signal strength associated with the at least one bin and the filtered signal strength is less than or equal to the threshold difference in signal strength, wherein, to track the at least one bin of the radar image based on the difference between the received signal strength and the filtered signal strength being less than or equal to the threshold difference in signal strength, the at least one processor is configured to:

track the at least one bin of the radar image further based on the determined number of instances over time.

6. The apparatus of claim 1, wherein the at least one processor is further configured to:

determine whether the difference between the received signal strength and the filtered signal strength is less than or equal to the threshold difference in signal strength based on the comparison of the received signal strength to the filtered signal strength.

7. The apparatus of claim 1, wherein the at least one processor is further configured to:

indicate the received signal strength associated with the at least one bin of the radar image to a tracking module, wherein, to track the at least one bin of the radar image based on the difference between the received signal strength and the filtered signal strength being less than or equal to the threshold difference in signal strength, the at least one processor is configured to:

track the at least one bin of the radar image using the tracking module.

8. The apparatus of claim 1, wherein the received signal strength of the detected signal corresponds to a state parameter for the target object.

9. The apparatus of claim 1, wherein the at least one processor is further configured to;

adjust the threshold difference in signal strength from a previous threshold difference in signal strength associated with a previous radar image of the plurality of radar images based on a change of at least one parameter.

10. The apparatus of claim 9, wherein the at least one parameter corresponds to a radar cross section (RCS) of a target object, and the change of the least one parameter corresponds to a number of bins for the target object indicated via the detected signal.

11. The apparatus of claim 9, wherein the at least one parameter corresponds to a maximum antenna gain, and the change of the at least one parameter corresponds to an angle associated with the detected signal.

12. The apparatus of claim 9, wherein the at least one parameter corresponds to a maximum path loss, and the change of the at least one parameter corresponds to a location associated with the detected signal.

13. The apparatus of claim 9, wherein the change of the at least one parameter corresponds to one or more of a receiver automatic gain control (AGC) configuration or a signal processing gain.

14. The apparatus of claim 13, wherein the change of the at least one parameter is based on $P_{rx}=P_{tx}+G_{tx}+G_{rx}+RCS-30 \log_{10}(4\pi)-40 \log_{10} R$, wherein $P_{rx}$ corresponds to a receive pathloss, $P_{tx}$ corresponds to a transmit pathloss, $G_{tx}$ corresponds to a transmit antenna gain, $G_{rx}$ corresponds to a receive antenna gain, RCS corresponds to a radar cross section, and R corresponds to a range.

15. The apparatus of claim 1, further comprising a transceiver coupled to the at least one processor, wherein the at least one processor is configured to:

receive the detected signal via the transceiver.

16. A method of wireless communication at a wireless device, comprising:

measuring a received signal strength of a detected signal, the received signal strength associated with at least one bin of a radar image;

comparing the received signal strength to a filtered signal strength, wherein the filtered signal strength is based on a plurality of received signal strength measurements associated with a target object, wherein each received signal strength measurement of the plurality of received signal strength measurements is associated with a discrete radar image of a plurality of radar images, wherein the filtered signal strength is associated with a threshold difference in signal strength; and tracking the at least one bin of the radar image based on a difference between to the received signal strength and the filtered signal strength being less than or equal to the threshold difference in signal strength.

17. The method of claim 16, further comprising:

excluding the at least one bin of the radar image from being tracked based on the difference between the received signal strength and the filtered signal strength being greater than the threshold difference in signal strength.

18. The method of claim 16, wherein the filtered signal strength corresponds to an expected strength of a reflected signal from the target object, the expected strength of the reflected signal based on the plurality of received signal strength measurements.

19. The method of claim 18, further comprising:

updating the filtered signal strength based on each received signal strength measurement of the plurality of received signal strength measurements.

20. The method of claim 16, further comprising:

determining a number of instances over time that the difference between the received signal strength associated with the at least one bin and the filtered signal strength is less than or equal to the threshold difference in signal strength, wherein tracking the at least one bin of the radar image based on the difference between the received signal strength and the filtered signal strength being less than or equal to the threshold difference in signal strength comprises:

tracking the at least one bin of the radar image further based on the determined number of instances over time.

21. The method of claim 16, further comprising:

determining whether the difference between the received signal strength and the filtered signal strength is less than or equal to the threshold difference in signal strength based on the comparison of the received signal strength to the filtered signal strength.

22. The method of claim 16, further comprising:

indicating the received signal strength associated with the at least one bin of the radar image to a tracking module, wherein tracking the at least one bin of the radar image based on the difference between the received signal strength and the filtered signal strength being less than or equal to the threshold difference in signal strength comprises:

tracking the at least one bin of the radar image using the tracking module.

23. The method of claim 16, wherein the received signal strength of the detected signal corresponds to a state parameter for the target object.

24. The method of claim 16, further comprising:

adjusting the threshold difference in signal strength from a previous threshold difference in signal strength associated with a previous radar image of the plurality of radar images based on a change of at least one parameter.

25. The method of claim 24, wherein the at least one parameter corresponds to a radar cross section (RCS) of a target object, and the change of the least one parameter corresponds to a number of bins for the target object indicated via the detected signal.

26. The method of claim 24, wherein the at least one parameter corresponds to a maximum antenna gain, and the change of the at least one parameter corresponds to an angle associated with the detected signal.

27. The method of claim 24, wherein the at least one parameter corresponds to a maximum path loss, and the change of the at least one parameter corresponds to a location associated with the detected signal.

28. The method of claim 24, wherein the change of the at least one parameter corresponds to one or more of a receiver automatic gain control (AGC) configuration or a signal processing gain.

29. The method of claim 28, wherein the change of the at least one parameter is based on $P_{rx} = P_{tx} + G_{tx} + G_{rx} + RCS - 30 \log_{10}(4\pi) - 40 \log_{10}R$, wherein $P_{rx}$ corresponds to a receive pathloss, $P_{tx}$ corresponds to a transmit pathloss, $G_{tx}$ corresponds to a transmit antenna gain, $G_{rx}$ corresponds to a receive antenna gain, RCS corresponds to a radar cross section, and R corresponds to a range.

30. A non-transitory computer-readable medium storing computer executable code at a wireless device, the code in response to being executed by at least one processor causes the at least one processor to:

measure a received signal strength of a detected signal, the received signal strength associated with at least one bin of a radar image;

compare the received signal strength to a filtered signal strength, wherein the filtered signal strength is based on a plurality of received signal strength measurements associated with a target object, wherein each received signal strength measurement of the plurality of received signal strength measurements is associated with a discrete radar image of a plurality of radar images, wherein the filtered signal strength is associated with a threshold difference in signal strength; and track the at least one bin of the radar image based on a difference between the received signal strength and the filtered signal strength being less than or equal to the threshold difference in signal strength.

\* \* \* \* \*